US008960257B2

(12) United States Patent
Goodman

(10) Patent No.: US 8,960,257 B2
(45) Date of Patent: Feb. 24, 2015

(54) METHODS, APPARATUSES, AND SYSTEMS FOR CONTROLLING LATERAL DISPLACEMENT OF A MOVABLE PARTITION

(75) Inventor: E. Carl Goodman, Bountiful, UT (US)

(73) Assignee: Won-Door Corporation, Salt Lake City, UT (US)

( * ) Notice: Subject to any disclaimer, the term of this patent is extended or adjusted under 35 U.S.C. 154(b) by 553 days.

(21) Appl. No.: 13/149,520

(22) Filed: May 31, 2011

(65) Prior Publication Data

US 2012/0304541 A1    Dec. 6, 2012

(51) Int. Cl.
| | |
|---|---|
| *A47H 5/00* | (2006.01) |
| *E06B 3/48* | (2006.01) |
| *E06B 3/94* | (2006.01) |
| *E06B 9/06* | (2006.01) |
| *E05D 15/26* | (2006.01) |
| *B60B 33/00* | (2006.01) |
| *B60B 33/02* | (2006.01) |

(52) U.S. Cl.
CPC ......... *B60B 33/0039* (2013.01); *B60B 33/0049* (2013.01); *B60B 33/0068* (2013.01); *B60B 33/025* (2013.01); *E06B 3/94* (2013.01); *B60B 2200/20* (2013.01); *B60B 2900/325* (2013.01)
USPC ........................................ 160/84.08; 160/199

(58) Field of Classification Search
USPC ........ 160/126, 127, 196.1, 203, 84.08, 84.11, 160/118, 199, 206; 16/100, 102, 105, 33, 16/34, 99
See application file for complete search history.

(56) References Cited

U.S. PATENT DOCUMENTS

| | | | |
|---|---|---|---|
| 684,130 | A | 10/1901 | Taubert |
| 1,205,707 | A | 11/1916 | Cahill |
| 1,377,626 | A | 5/1921 | Phillips |
| 1,448,845 | A | 3/1923 | Johnson et al. |
| 1,463,347 | A | 7/1923 | Walker |
| 1,595,669 | A | 8/1926 | Kurner |
| 1,612,443 | A | 12/1926 | Johnson et al. |
| 1,644,285 | A | 10/1927 | Smith |
| 1,786,505 | A | 12/1930 | Phillips |
| 1,833,496 | A | 11/1931 | Phillips |
| 1,964,316 | A | 6/1934 | Ellison |
| 2,027,992 | A | 1/1936 | Maurer |

(Continued)

FOREIGN PATENT DOCUMENTS

| | | |
|---|---|---|
| DE | 2506469 A1 | 8/1975 |
| DE | 2755157 A1 | 6/1979 |

(Continued)

*Primary Examiner* — Katherine Mitchell
*Assistant Examiner* — Jeremy Ramsey
(74) *Attorney, Agent, or Firm* — TraskBritt

(57) ABSTRACT

Apparatuses, methods and systems for directionally controlling a movable partition are provided. In one embodiment, an apparatus for controlling lateral displacement of a movable partition includes a bracket, a roller assembly, a first attachment bracket, and a second attachment bracket. The roller assembly is coupled to the bracket and includes a roller element. The first attachment bracket attaches to a first panel of the movable partition and is configured for hinged coupling to a first side of the bracket such that a first pivot line substantially coincides with a centerline of the first panel. The second attachment bracket attaches to a second panel of the movable partition and is configured hinged coupling to a second side of the bracket such that a second pivot line substantially coincides with a centerline of the second panel.

30 Claims, 11 Drawing Sheets

(56) References Cited

U.S. PATENT DOCUMENTS

| | | | |
|---|---|---|---|
| 2,043,981 A | 6/1936 | Bickel | |
| 2,151,033 A | 3/1939 | Jones | |
| 2,736,373 A | 2/1956 | Truesdale | |
| 2,915,115 A | 12/1959 | Reynolds | |
| 3,039,554 A | 6/1962 | Hosking et al. | |
| 3,082,817 A | 3/1963 | Merrill | |
| 3,102,581 A | 9/1963 | Kochanowski | |
| 3,133,589 A | 5/1964 | Harris | |
| 3,223,147 A | 12/1965 | Holloway | |
| 3,289,741 A | 12/1966 | Gossling | |
| 3,295,257 A | 1/1967 | Douglass | |
| 3,348,628 A * | 10/1967 | Dixon et al. | 181/287 |
| 3,389,741 A | 6/1968 | Bean | |
| 3,447,584 A | 6/1969 | Smart | |
| 3,453,790 A | 7/1969 | Harris | |
| 3,481,388 A | 12/1969 | Smart | |
| 3,509,934 A | 5/1970 | Smart | |
| 3,577,679 A | 5/1971 | Petterborg | |
| 3,698,036 A * | 10/1972 | Goodman | 16/100 |
| 3,720,254 A | 3/1973 | Smart | |
| 3,850,223 A | 11/1974 | Tompkins | |
| 3,910,338 A | 10/1975 | Pontoppidan | |
| 3,972,381 A | 8/1976 | Gail | |
| 3,979,861 A | 9/1976 | Fromme et al. | |
| 4,014,072 A | 3/1977 | Schumacher | |
| 4,133,364 A | 1/1979 | Smart | |
| 4,154,280 A | 5/1979 | Hashimoto | |
| 4,172,423 A | 10/1979 | Monne | |
| 4,408,369 A | 10/1983 | Labelle | |
| 4,658,878 A | 4/1987 | Williams | |
| 4,763,712 A * | 8/1988 | van der Klaauw | 160/84.08 |
| 4,834,161 A | 5/1989 | Johnson et al. | |
| 4,852,628 A | 8/1989 | Klein | |
| 4,867,221 A * | 9/1989 | Dixon et al. | 160/84.08 |
| 4,887,659 A | 12/1989 | West | |
| 4,922,987 A | 5/1990 | Marontate et al. | |
| 4,924,929 A | 5/1990 | Johnson et al. | |
| 4,932,455 A | 6/1990 | Yamada | |
| 4,957,600 A | 9/1990 | Carlson et al. | |
| 5,025,846 A | 6/1991 | West | |
| 5,065,807 A | 11/1991 | Maeda et al. | |
| 5,143,137 A | 9/1992 | West | |
| 5,287,908 A | 2/1994 | Hoffmann et al. | |
| 5,295,527 A | 3/1994 | West | |
| 5,373,887 A | 12/1994 | Glover et al. | |
| 5,411,072 A | 5/1995 | Starck et al. | |
| 5,456,303 A | 10/1995 | Horinouchi | |
| 5,477,902 A | 12/1995 | Kraeutler | |
| 5,542,460 A | 8/1996 | McKeon | |
| 5,577,348 A | 11/1996 | Keller | |
| 5,638,639 A | 6/1997 | Goodman et al. | |
| 5,749,407 A | 5/1998 | Brenner et al. | |
| 5,828,972 A | 10/1998 | Asanuma et al. | |
| 5,947,178 A | 9/1999 | Patten | |
| 6,035,918 A | 3/2000 | Kraeutler | |
| 6,098,695 A | 8/2000 | Schwingle | |
| 6,145,568 A | 11/2000 | Lundstrom | |
| 6,209,171 B1 | 4/2001 | Pelletier et al. | |
| 6,223,804 B1 | 5/2001 | Toti | |
| 6,267,169 B1 | 7/2001 | McDonald | |
| 6,283,189 B1 | 9/2001 | Liebscher | |
| 6,286,258 B1 | 9/2001 | Bischof et al. | |
| 6,360,518 B1 | 3/2002 | Scott et al. | |
| 6,378,440 B1 | 4/2002 | Rhodes | |
| 6,601,637 B2 | 8/2003 | Toti | |
| 6,615,894 B1 | 9/2003 | McKeon | |
| 6,662,848 B2 | 12/2003 | Goodman et al. | |
| 6,708,094 B2 | 3/2004 | Charaudeau | |
| 6,766,847 B1 | 7/2004 | Wang | |
| 7,050,283 B2 | 5/2006 | Field et al. | |
| 7,066,297 B2 | 6/2006 | Goodman et al. | |
| 7,190,132 B2 | 3/2007 | Goodman et al. | |
| 7,478,663 B2 | 1/2009 | Goodman et al. | |
| 7,513,293 B2 | 4/2009 | Goodman et al. | |
| 7,647,729 B2 | 1/2010 | Polus | |
| 7,656,129 B2 | 2/2010 | Banta et al. | |
| 7,699,089 B2 | 4/2010 | Knutson et al. | |
| 7,737,860 B2 | 6/2010 | Banta et al. | |
| 7,740,046 B2 | 6/2010 | Goodman et al. | |
| 7,782,019 B2 | 8/2010 | Banta et al. | |
| 7,845,384 B2 | 12/2010 | Goodman et al. | |
| 7,845,385 B2 | 12/2010 | Goodman et al. | |
| 7,845,386 B2 | 12/2010 | Coleman et al. | |
| 7,854,248 B2 | 12/2010 | Coleman et al. | |
| 7,874,341 B2 | 1/2011 | Coleman et al. | |
| 7,886,804 B2 | 2/2011 | Goodman et al. | |
| 7,926,538 B2 | 4/2011 | Coleman et al. | |
| 7,931,067 B2 * | 4/2011 | Goodman et al. | 160/84.08 |
| 8,051,616 B2 | 11/2011 | George | |
| 2003/0226645 A1 | 12/2003 | Toti | |
| 2004/0069420 A1 | 4/2004 | Petriello | |
| 2004/0173325 A1 | 9/2004 | Maas | |
| 2005/0217802 A1 | 10/2005 | Goodman et al. | |
| 2006/0144529 A1 | 7/2006 | Hemphill | |
| 2007/0152427 A1 | 7/2007 | Olsen | |
| 2007/0272370 A1 | 11/2007 | Knutson et al. | |
| 2008/0105387 A1 | 5/2008 | Coleman et al. | |
| 2008/0105389 A1 | 5/2008 | Goodman et al. | |
| 2008/0115896 A1 | 5/2008 | Goodman | |
| 2008/0169069 A1 | 7/2008 | Coleman | |
| 2008/0264578 A1 | 10/2008 | Goodman et al. | |
| 2009/0188633 A1 | 7/2009 | Goodman et al. | |
| 2010/0102764 A1 | 4/2010 | Banta et al. | |
| 2010/0214709 A1 | 8/2010 | Hall et al. | |
| 2010/0299871 A1 * | 12/2010 | Kondash et al. | 16/91 |
| 2011/0000625 A1 | 1/2011 | George | |
| 2011/0005689 A1 | 1/2011 | Coleman et al. | |
| 2011/0024061 A1 | 2/2011 | Bell et al. | |
| 2011/0036016 A1 | 2/2011 | Knight et al. | |
| 2011/0036509 A1 | 2/2011 | Goodman et al. | |
| 2011/0036513 A1 | 2/2011 | Banta et al. | |
| 2011/0061820 A1 | 3/2011 | Coleman et al. | |
| 2011/0088322 A1 | 4/2011 | Coleman et al. | |
| 2011/0093095 A1 | 4/2011 | Goodman et al. | |
| 2011/0186249 A1 | 8/2011 | Coleman et al. | |
| 2011/0203746 A1 | 8/2011 | Smart | |
| 2011/0247275 A1 | 10/2011 | Coleman et al. | |
| 2011/0247764 A1 | 10/2011 | Coleman et al. | |

FOREIGN PATENT DOCUMENTS

| | | |
|---|---|---|
| DE | 29506707 U1 | 8/1995 |
| DE | 202005000165 U1 | 3/2006 |
| EP | 0111962 | 6/1984 |
| EP | 1630337 A1 | 3/2006 |
| GB | 1226442 | 3/1971 |
| JP | 07317422 | 5/1995 |
| JP | 07317423 | 5/1995 |
| WO | 2005098189 A1 | 10/2005 |

* cited by examiner

METHODS, APPARATUSES, AND SYSTEMS FOR CONTROLLING LATERAL DISPLACEMENT OF A MOVABLE PARTITION

TECHNICAL FIELD

Embodiments of the present disclosure generally relate to movable partitions and, more particularly, to the control of movement of such partitions including, for example, foldable doors.

BACKGROUND

Movable partitions are utilized in numerous situations and environments for a variety of purposes. Such partitions may include, for example, foldable or collapsible doors configured to enclose or subdivide a room or other area. Often such partitions may be utilized simply for purposes of versatility in being able to subdivide a single large room into multiple smaller rooms. The subdivision of a larger area may be desired, for example, to accommodate multiple groups or meetings simultaneously. In other applications, such partitions may be utilized for noise control depending, for example, on the activities taking place in a given room or portion thereof.

Movable partitions may also be used to provide a security barrier, a fire barrier, or a combination thereof. In such a case, the collapsible door may be configured to automatically close upon the occurrence of a predetermined event such as the actuation of an associated alarm. For example, one or more accordion or similar folding-type doors may be used as a security door, a fire door, or a combination thereof wherein each door is formed with a plurality of panels hingedly connected to one another. The hinged connection of the panels allows the door to fold up in a compact unit for purposes of storage when not deployed. Thus, the door may be stored, for example, in a pocket formed in the wall of a building when in a retracted or folded state. When deployment of the door is required to secure an area during a fire or for any other specified reason, the door is driven by a motor along a track, conventionally located above the door in a header, until the door is extended a desired distance across the room to form an appropriate barrier.

When deployed, a leading edge of the door, which may be defined by a component known as a lead post, complementarily engages a receptacle in a fixed structure, such as a wall, or in a mating receptacle of another door. Such a receptacle may be referred to as a jamb or a door post when formed in a fixed structure, or as a mating lead post when formed in another door. It is desirable that the lead post be substantially aligned with the mating receptacle such that the door may be completely closed and an appropriate seal formed between the door and mating receptacle. For example, if the door is being used as a fire door, it is desirable that the lead post of a door is fully engaged with the mating receptacle to prevent drafts and any attendant flames or smoke from traversing the barrier formed by the partition and, more particularly, the joint formed by the lead post and receptacle.

In some cases, during opening and closing, the lower edge of the door may be laterally displaced relative to the top edge of the door, which is relatively fixed in a lateral sense due to its engagement with the track and header. Such lateral displacement of the door's lower edge may be caused, for example, by the opening and closing processes, by a fire-induced draft, by an improperly balanced HVAC system, or simply from an occupant of a room pushing against the door while it is being deployed. If the lower edge of the lead post is laterally displaced relative to its upper edge as the leading edge of the door approaches the mating receptacle, the lead post will not be properly aligned with the mating receptacle and an appropriate seal will not be formed. Moreover, if the lower edges of the panels become displaced relative to their upper edges, the door may not be positioned as desired and the out-of-plumb configuration may cause problems with operation of the door.

As noted above, the failure of the lead post to properly engage the receptacle may have substantial consequences when, for example, the door is being used as a fire or security barrier. At a minimum, even when the door is not used as a fire or security barrier, the failure of the lead post to properly engage the mating receptacle will result in the inability to completely subdivide a larger room and visually or acoustically isolate the subdivided room.

One approach to preventing or controlling the lateral displacement of a lower edge of the door has included forming a guide track within the floor of a room and then causing the door or barrier to engage the track as it is deployed and retracted such that the door is laterally constrained relative to the path of the track. However, the placement of a track in the floor of a room is not an ideal solution for all environments. For example, such a track provides a place for collection of dust and debris and may, thereby, become an unsightly feature of the room. In some cases, the collection of debris may affect the proper operation of the door itself. Additionally, the existence of a track in the floor, regardless of whether it is protruding from the floor or recessed within the floor, may act as a hazard or potential source of injury depending, for example, on the intended use of the area and the actual location of the floor track within that area.

Moreover, even if one were to use a track in the floor, floors often exhibit an undesirable amount of unevenness presenting additional difficulties. For example, it becomes difficult to install an even and level track in a floor or other supporting surface that is not even. If the track is not substantially even and level, the bottom edge of the partition, or some component associated therewith, may have trouble maintaining engagement with the track while it is being displaced. Likewise, other devices that may attempt to maintain engagement with (or maintain some other specified relationship with) an adjacent or an underlying surface may experience difficulty doing so due to the unevenness and undulating nature of such a surface.

In view of the current state of the art, it would be advantageous to provide methods, apparatuses and systems with improved and simplified control of lateral movement of hinged panels forming a movable partition.

BRIEF SUMMARY

Embodiments of the present disclosure provide improved and simplified control of lateral movement of hinged panels forming a movable partition.

In accordance with one embodiment of the present disclosure, an apparatus for controlling lateral displacement of a movable partition includes a bracket, a roller assembly, a first attachment bracket, and a second attachment bracket. The roller assembly is coupled to the bracket and includes at least one roller element. The first attachment bracket is configured for attachment to a first panel of the movable partition and configured for a first hinged coupling to a first side of the bracket such that a first pivot line of the first hinged coupling substantially coinciding with a centerline of the first panel. The second attachment bracket is configured for attachment to a second panel of the movable partition and configured for a second hinged coupling to a second side of the bracket such that a second pivot line of the second hinged coupling substantially coinciding with a centerline of the second panel.

In accordance with another embodiment of the present disclosure, a displacement control assembly for a movable partition includes a bracket, a first attachment bracket hingedly coupled to a first side of the bracket to form a first pivot line, and a second attachment bracket hingedly coupled to a second side of the bracket to form a second pivot line. A roller assembly including at least one roller element is coupled to the bracket between the first pivot line and the second pivot line. When assembled, the first attachment bracket is attached to a first panel of the movable partition with the first pivot line substantially in line with a centerline of the first panel and the second attachment bracket is attached to a second panel of the movable partition with the second pivot line substantially in line with a centerline of the second panel. The roller assembly is positioned to contact a surface of an adjacent structure and provide resistance to a lateral movement of a lower edge of the first panel relative to an upper portion of the first panel.

In accordance with a further embodiment of the present disclosure, a method of controlling a movable partition includes providing a roller assembly coupled to one or more panels of the movable partition such that at least one roller element of the roller assembly is in contact with a surface of an adjacent structure that the one or more panels will traverse. The method also includes displacing the movable partition along a path adjacent the surface of the adjacent structure. A substantially plumb inclination of the one or more panels is maintained by resisting movement of the at least one roller element in a direction substantially perpendicular to the path while the roller assembly is hingedly coupled to each of the one or more panels along a centerline of each of the one or more panels.

In accordance with yet another embodiment of the present disclosure, an automatic door includes a plurality of pivotably coupled panels, a drive configured to motivate the plurality of pivotably coupled panels along a defined pathway, and one or more apparatuses coupled proximate a lower edge of one or more of the pivotably coupled panels. Each of the apparatuses includes a bracket, a roller assembly attached to the bracket and includes at least one roller element, a first attachment bracket is hingedly coupled to a first side of the bracket to form a first pivot line, and a second attachment bracket is hingedly coupled to a second side of the bracket to form a second pivot line. The first attachment bracket is attached to a first panel of the pivotably coupled panels such that the first pivot line aligns with a centerline of the first panel and the second attachment bracket is attached to a second panel of the pivotably coupled panels such that the second pivot line aligns with a centerline of the second panel.

BRIEF DESCRIPTION OF THE SEVERAL VIEWS OF THE DRAWINGS

Details of the disclosure will become apparent upon reading the following detailed description and upon reference to the drawings, in which.

DETAILED DESCRIPTION

Figure 1A:
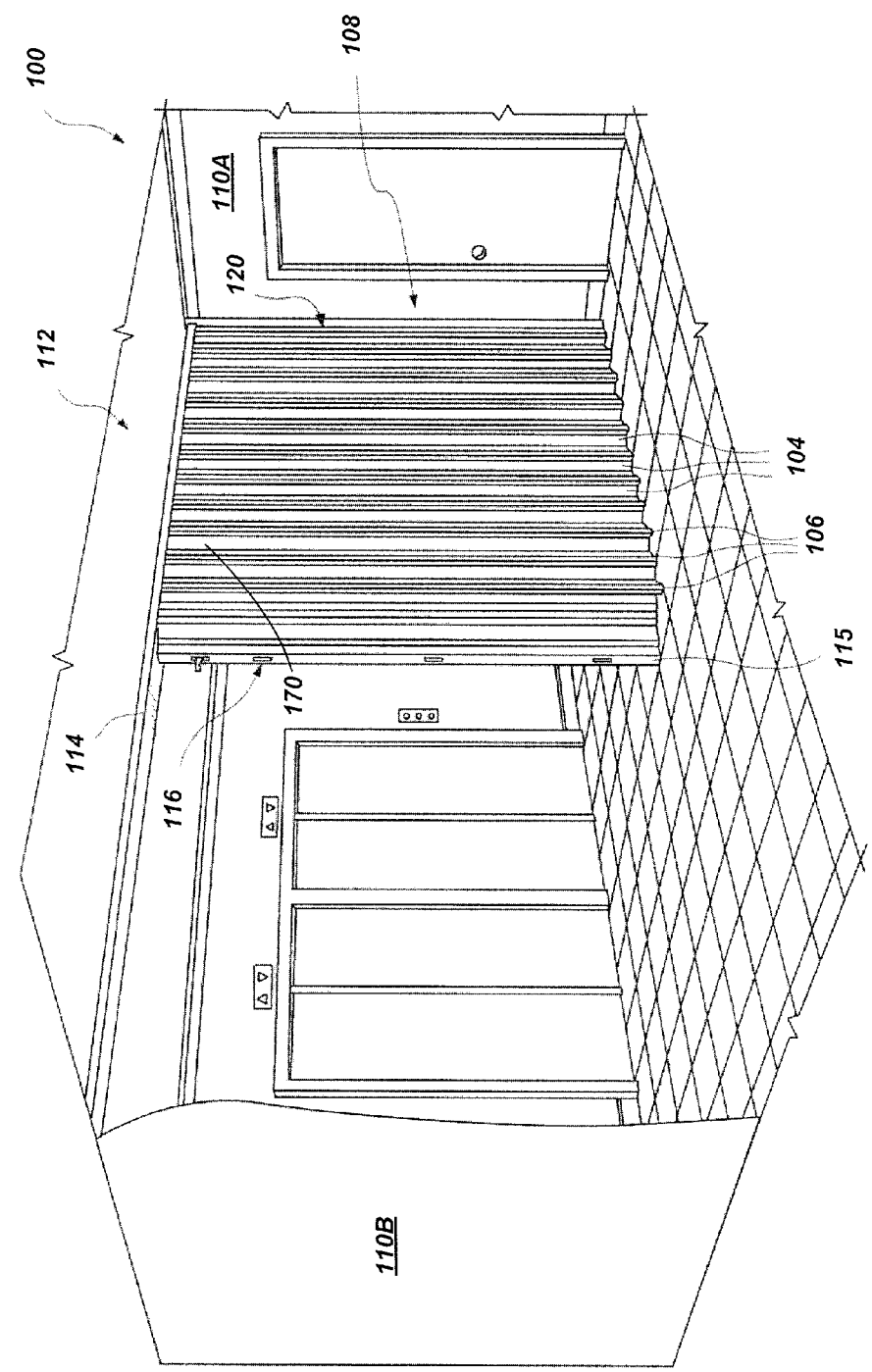
FIGS. 1A-1C show a perspective view, a side view and a top view, respectively, of a system with a movable partition in accordance with an embodiment of the present disclosure.

In this description, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Referring in general to the following description and accompanying drawings, various embodiments are illustrated to show its structure and method of operation, sufficient to enable one of ordinary skill in the art to make, use, or otherwise practice the present disclosure. Common elements of the illustrated embodiments may be designated with similar reference numerals. It should be understood that the figures presented are not meant to be illustrative of actual views of any particular portion of an actual structure or method, but are merely idealized representations employed to more clearly and fully depict the present disclosure defined by the claims below. It is to be understood that other embodiments may be utilized, and that structural, logical, and electrical changes may be made within the scope of the disclosure.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. A reference to first and second elements does not mean that only two elements may be employed there or that the first element must precede the second element in some manner. Also, unless stated otherwise a set of elements may comprise one or more elements.

Embodiments of the present disclosure provide improved and simplified control of lateral movement of hinged panels forming a movable partition.

Figure 1B:
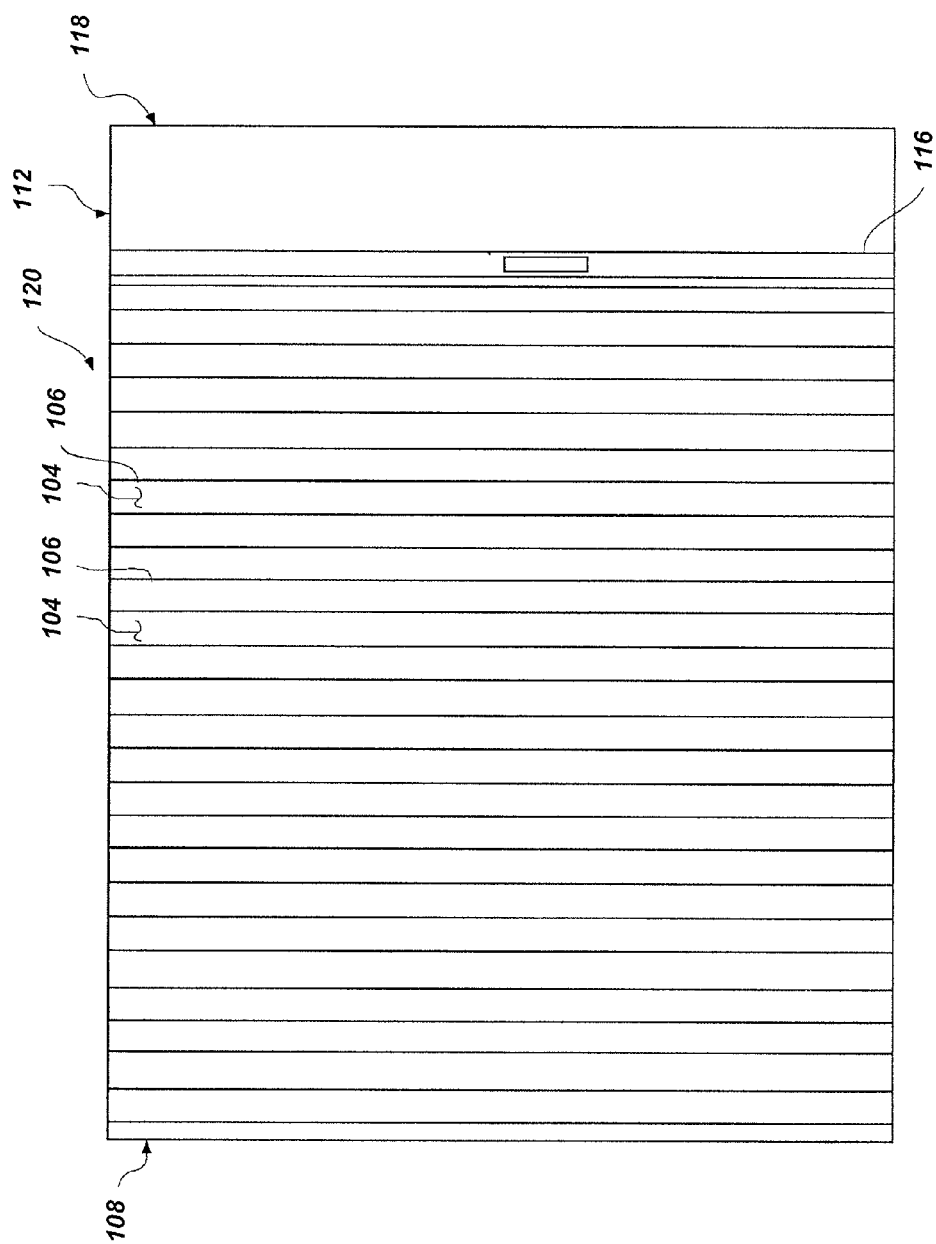
Figure 1C:
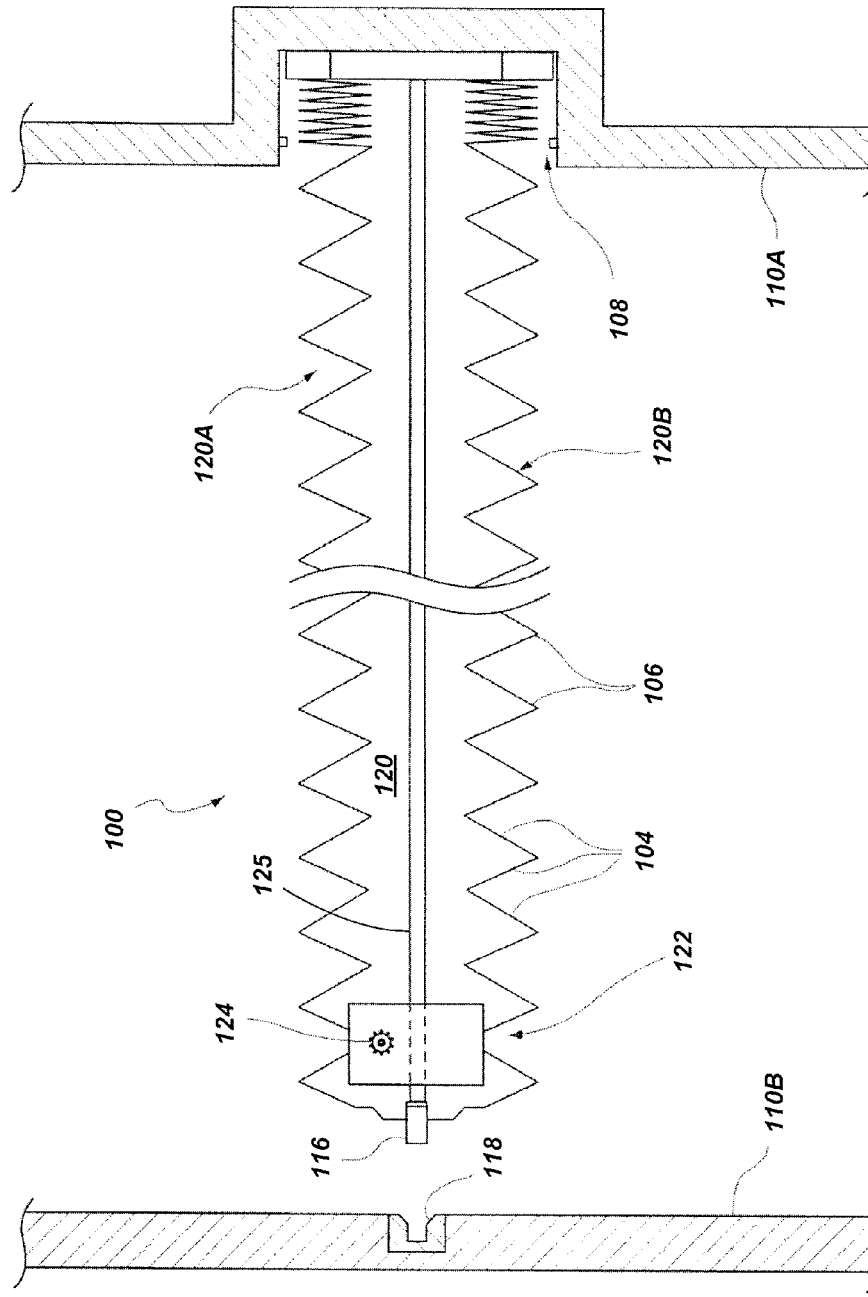

Referring to FIGS. 1A-1C, a system 100 is shown, which may also be referred to as an automatic door system, including a movable partition 120 in the form of an accordion-type door 120. The door 120 (also referred to herein as a movable partition 120) may be used, for example, as a security and/or fire door. In other embodiments, the door 120 need not be utilized as a fire or security door, but may be used simply for the subdividing of a larger space into smaller rooms or areas. The door 120 may be aimed with a plurality of panels 104 that are connected to one another with hinges, other hinge-like members, or other coupling devices that enable a pivoting between the panels 104. As a non-limiting example, the panels 104 may be configured in a manner that they interlock, while still allowing the pivoting between the panels 104 where they are interlocked. For simplicity in explanation, and not for limitation, the pivot-like coupling may be referred to herein as using hinges 106 or pivotable couplings 106. The pivotably coupled panels 104 enable the door 120 to be compactly stored or "stacked" in a pocket 108 formed in a wall 110A of a building when in a retracted or folded state.

When it is desired to deploy the door 120 to an extended position, for example, to secure an area such as an elevator lobby 112 during a fire, the door 120 is driven along a track 114 across the space to provide an appropriate barrier. When in a deployed or an extended state, a leading edge of the door 120, shown in the presently described embodiment as a male lead post 116, complementarily or matingly engages with a jamb or door post 118 that may be formed in a wall 110B of a building.

As can be seen in FIG. 1C, an accordion-type door 120 may include a first accordion-style partition 120A and a second accordion-style partition 120B that is laterally spaced from the first partition 120A. Such a configuration may be utilized as a fire door wherein one partition 120A acts as a primary fire and smoke barrier, a space between the two partitions 120A and 120B acts as an insulator or a buffer zone, and the second partition 120B acts as a secondary fire and smoke barrier. Such a configuration may also be useful in providing an acoustical barrier when the door 120 is used to subdivide a larger space into multiple, smaller rooms.

A drive 122, which may include, for example, a motor 124 and a drive belt or chain 125 (FIG. 1C), may be configured to open and close the door 120 upon actuation thereof. The automatic door system 100 may further include various sensors and switches to assist in the control of the door 120 through appropriate connection with the drive 122. For example, when used as a fire door, the door 120 may include a switch or actuator, commonly referred to as "panic hardware." Actuation of the switch or actuator allows a person located on one side of the door 120 to cause the door to open if it is closed, or to stop while it is closing, allowing access through the barrier formed by the door for a predetermined amount of time. Moreover, the automatic door system 100 may further include, or may be associated with, an alarm system which, upon providing an appropriate signal, results in deployment or retraction of the door 120 depending on the specific situation.

It is also noted that, while the exemplary embodiment shown and described with respect to FIGS. 1A-1C is directed to a single accordion-type door 120, other movable partitions may be utilized. For example, a two-door, or bi-part door, system may be utilized wherein two similarly configured doors extend across a space and join together to form an appropriate barrier. Also, the present disclosure may be applicable to movable partitions or barriers other than the accordion-type doors that are shown and described herein in example embodiments.

Referring still to FIGS. 1A-1C, the door 120 of the present disclosure may further include a directional control apparatus (not shown) that may be used to ensure vertical alignment of the door 120 or at least a portion thereof. For example, upon the exertion of an external force in a generally lateral direction, such as by a draft or from an individual pushing on the door 120 while it is being deployed or retracted, the panels 104 of the door 120 may deviate from their intended plumb, or substantially vertical, orientation. In other words, the lower portion of the door 120, such as a lower edge 115, may become laterally displaced relative to an upper portion 170 of the door 120, the upper portion 170 being substantially laterally fixed by virtue of its engagement with the track 114. As previously discussed, in such a case where the lead post 116 is substantially out of plumb (e.g., not substantially vertically oriented), the lead post 116 will not properly engage the jamb or door post 118 and will prevent the door 120 from properly closing and forming a proper barrier. However, in accordance with the present disclosure, the directional control apparatus may be configured to reduce a deviation of the door 120 from its desired course or orientation, such as with respect to a plumb inclination.

Figure 2:
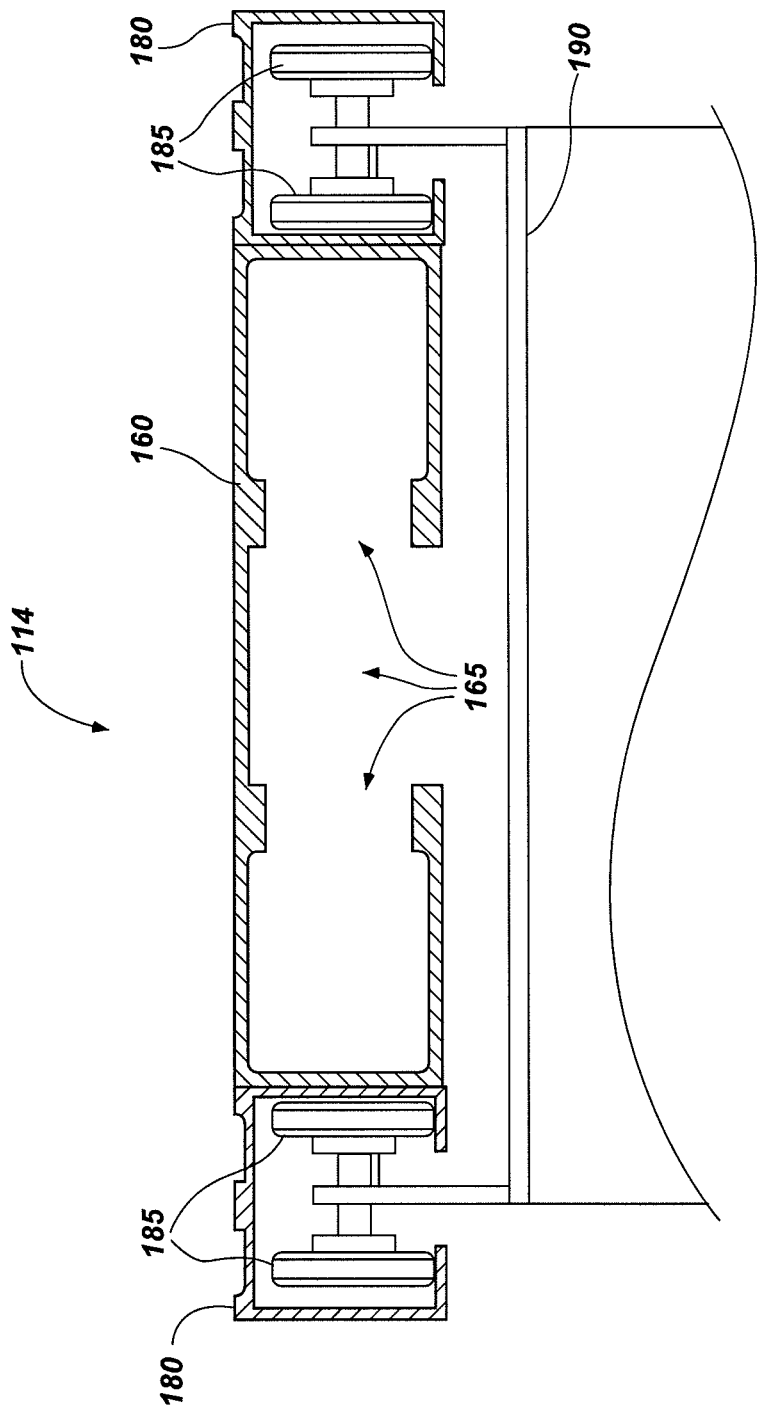
FIG. 2 shows a cross-section view of a track the may be used when accompanied with an embodiment of the present disclosure.

FIG. 2 shows a cross-section view of a track 114 that may be used when accompanied with an embodiment of the present disclosure. That track 114 is illustrated merely as an example of a type of track that may be used with movable partitions 120 used with embodiments of the present disclosure. A support system may comprise the track 114, which may comprise an elongated drive guide member 160 located generally centrally in the track 114, and two elongated roller guide members 180 disposed on opposite lateral ends of the elongated drive guide member 160. In some embodiments, the drive guide member 160 and roller guide members 180 may comprise separate bodies or structures that are attached to one another, or simply installed proximate one another. In other embodiments, the drive guide member 160 and roller guide members 180 may comprise different regions of a single, unitary body or structure.

The drive guide member 160 may comprise a hollow body having internal surfaces defining a drive channel 165 that extends longitudinally through the drive guide member 160 and is located generally centrally in the track 114. The drive channel 165, also known as an internal channel, defined by the drive guide member 160, may be used to at least partially house rollers (e.g., wheels), drive mechanism components (e.g., an elongated drive member), or other components of the movable partition system 100 (not shown) as known in the art. Each of the roller guide members 180 may also comprise a hollow body having internal surfaces defining internal roller channels that extend longitudinally through each roller guide member 180 and are located at opposing lateral ends of the drive guide member 160. The roller channels may be partially defined by a bottom surface and innermost side surfaces internal to the roller guide members 180. Thus, the bottom and innermost side surfaces may define portions of the internal roller channels of the track 114. Portions of the partition system 100, such as, for example, the movable partition 120 and the lead post 116 (see FIG. 1C), may be suspended from (i.e., hang from) a trolley 190 and move along the track 114 by the rolling of partition support rollers 185 (e.g., wheels or bearings) within and along the roller channels that extend through the roller guide members 180 of the track 114 in a direction at least substantially parallel to a direction of movement of the movable partition 120.

Figure 3:
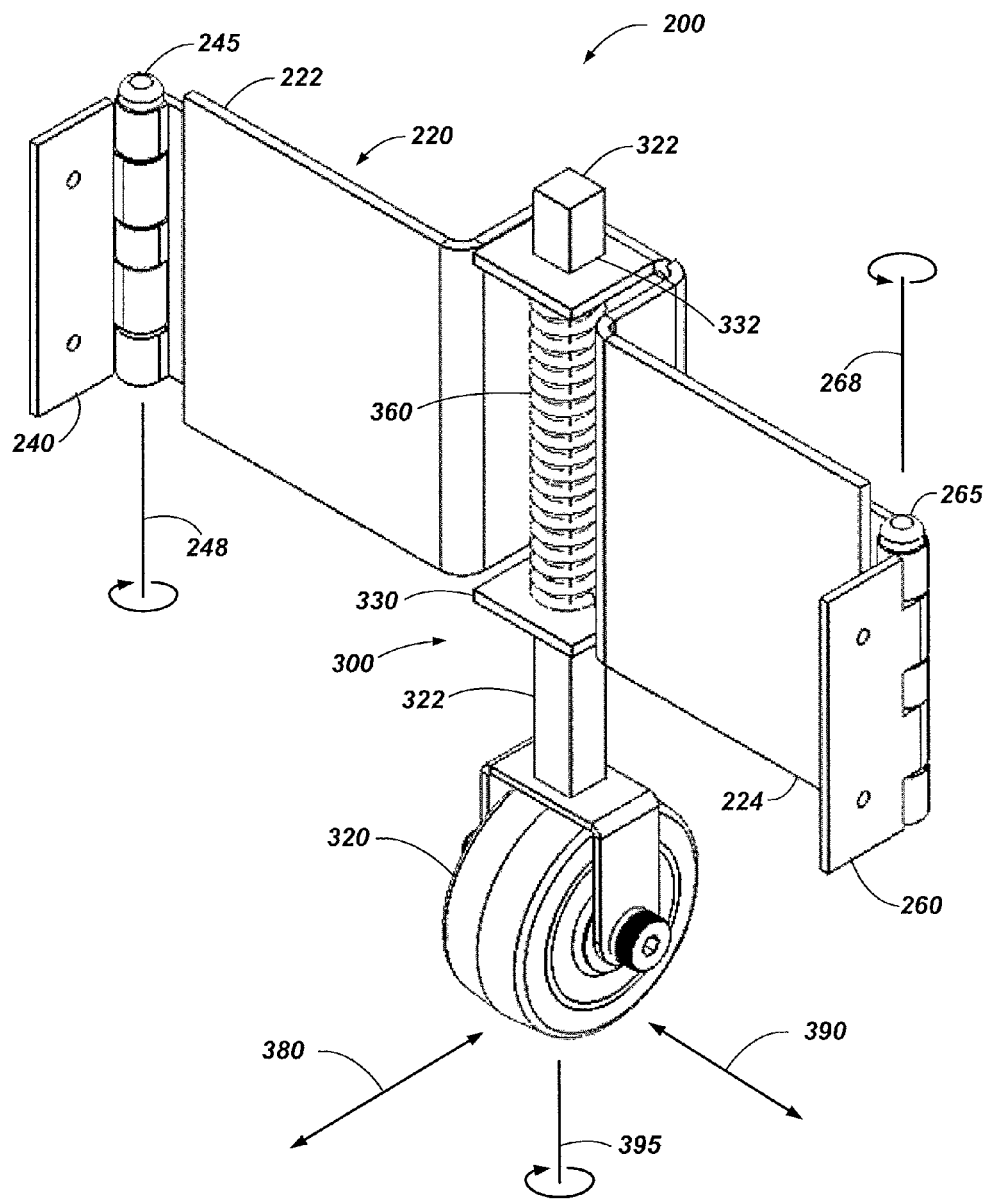
FIG. 3 shows a perspective view of a bracket and roller assembly in accordance with an embodiment of the present disclosure.

FIG. 3 shows a perspective view of a bracket and roller assembly 200 in accordance with an embodiment of the present disclosure. A bracket 220 includes a first side 222 and a second side 224. A receiver 330 is positioned between the first side 222 and the second side 224 and is configured for receiving a roller assembly 300. The receiver may be an integral part of the bracket 220 or may be affixed to the bracket 220, such as, for example, by weld, adhesive, or screws. The receiver 330 includes one or more holes 332 for accepting a pin 322. In the embodiment shown in FIG. 3, the holes 332 and pin 322 are shown as square, which helps resist pivoting of the roller assembly 300, as explained below. Of course, other polygonal shapes for the pin 322 and compatible polygonal holes 332 may be used. Moreover, in some cases, as explained below, a circular pin 322 and hole 332 may also be used.

A first attachment bracket 240 is coupled to the first side 222 with a first hinge mechanism 245 such that the first attachment bracket 240 pivots relative to the first side 222 along a first pivot line 248. Similarly, a second attachment bracket 260 is coupled to the second side 224 with a second hinge mechanism 265 such that the second attachment bracket 260 pivots relative to the second side 224 along a second pivot line 268.

The roller assembly 300 moves along a line of travel 380 and resists lateral movement of the bracket and roller assembly 200 in a lateral direction 390. In addition, various roller pivot control structures may be used for resisting a pivoting motion 395 of one or more roller elements 320 (only one roller element 320 is shown in FIG. 3).

A longitudinal biasing element 360 may be coupled between the roller assembly 300 and the bracket 220 to provide a substantially vertical biasing force to keep the roller element 320 in contact with a surface (not shown).

Figure 4:
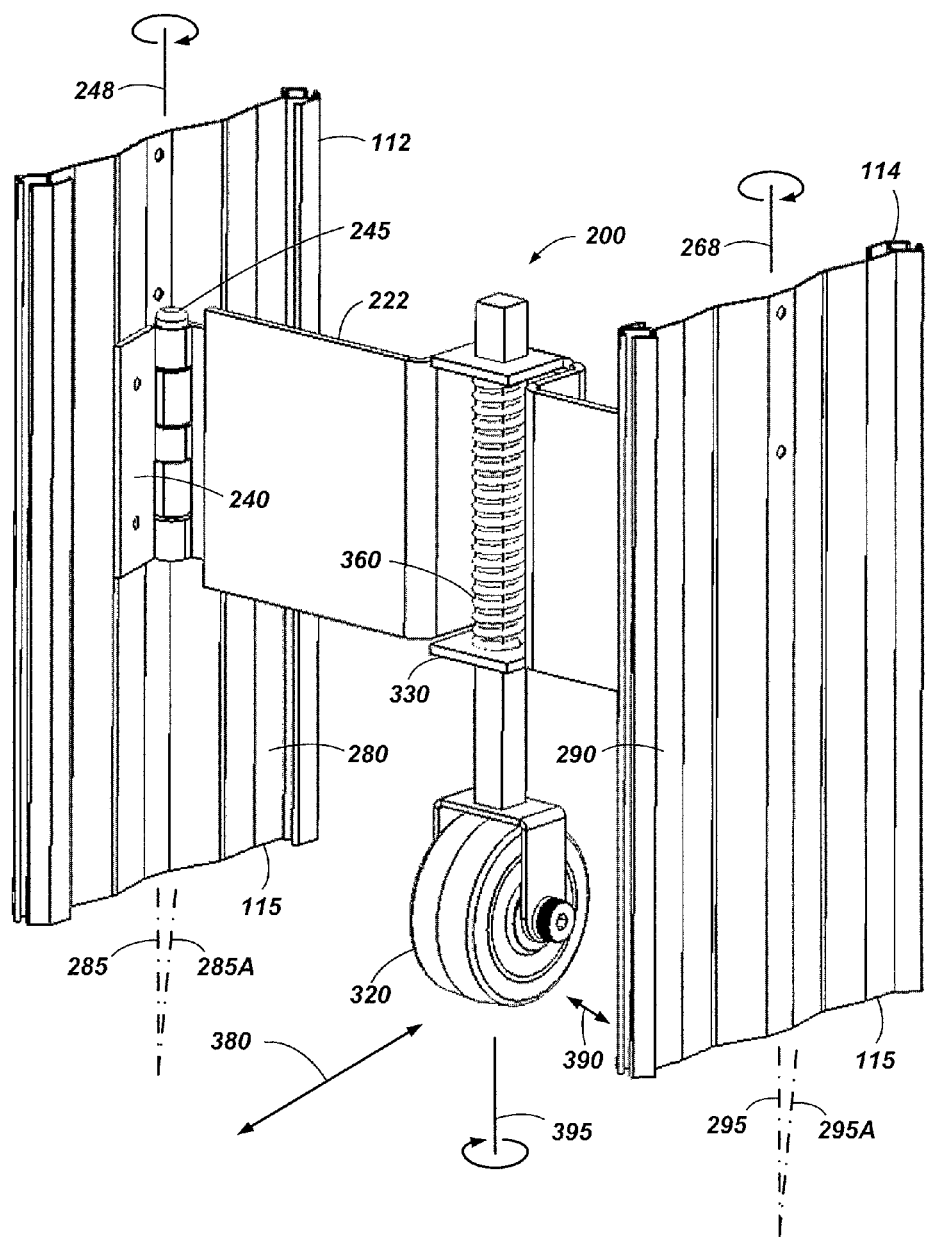
FIG. 4 shows a perspective view of the bracket and roller assembly of FIG. 3 attached to panels of a movable partition in accordance with an embodiment of the present disclosure.

FIG. 4 shows a perspective view of the bracket and roller assembly 200 of FIG. 3 attached to panels (280, 290) of a movable partition in accordance with an embodiment of the present disclosure. The bracket and roller assembly may also be referred to herein as a displacement control assembly 200. A first panel 280 is attached to the first attachment bracket 240, which has a first hinged coupling formed with the first side 222 due to the first hinge mechanism 245. Also, hidden from view behind a second panel 290, the second panel 290 is attached to the second attachment bracket 260, which has a second hinged coupling formed with the second side 224 due to the second hinge mechanism 265. Function of these hidden elements can be understood from a combination of FIG. 3 and FIG. 4 and is similar to that of the shown elements for the first attachment bracket 240.

The first hinged coupling formed by the first hinge mechanism 245 forms the first pivot line 248 and the second hinged coupling formed by the second hinge mechanism 265 forms the second pivot line 268.

Figure 5:
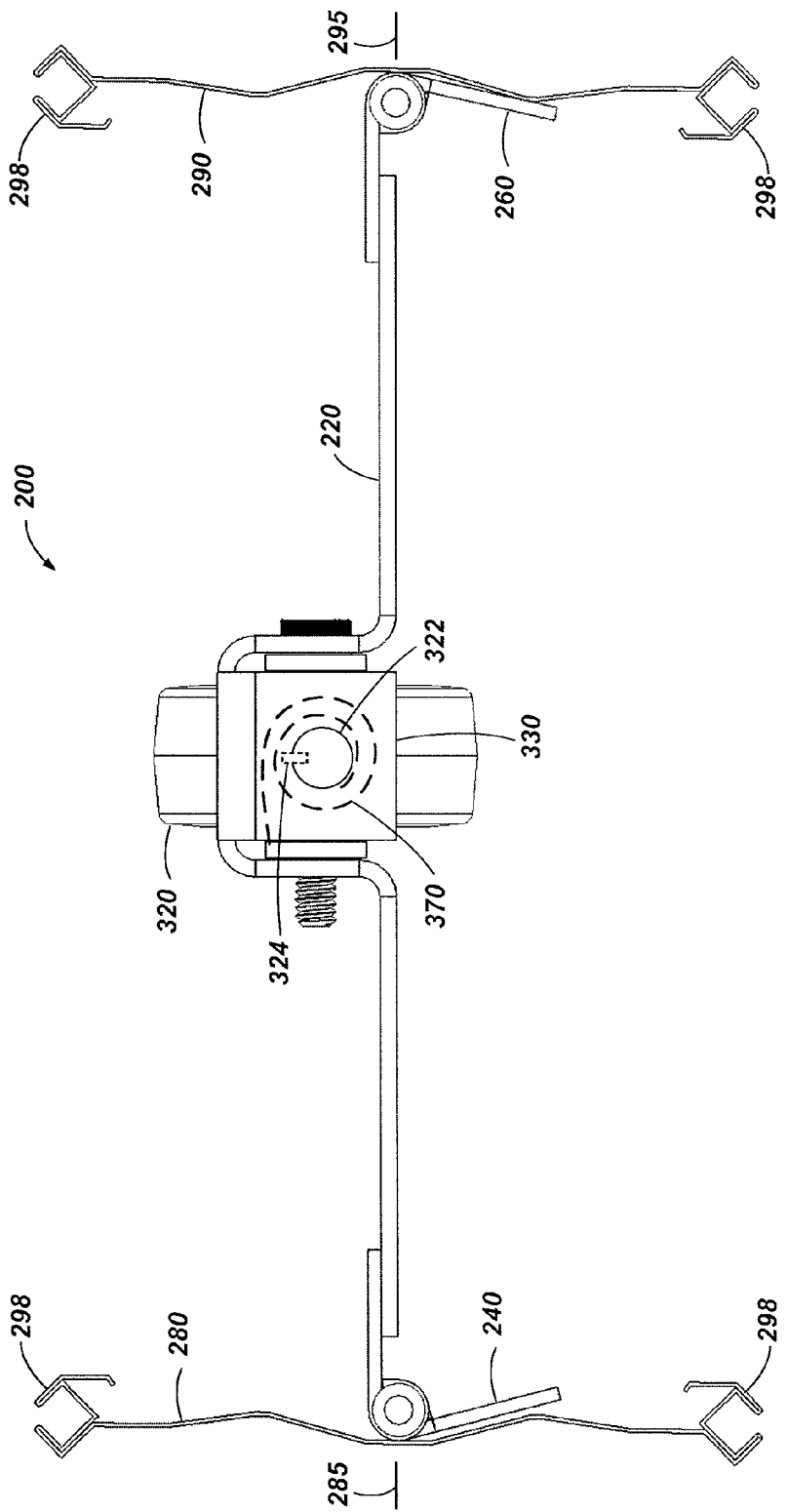
FIG. 5 shows a top view of the bracket and roller assembly attached to panels of the movable partition in accordance with an embodiment of the present disclosure.

FIG. 5 shows a top view of the bracket and roller assembly 200 attached to panels (280, 290) of the movable partition in accordance with an embodiment of the present disclosure. The bracket 220 forms the first hinged coupling with the first attachment bracket 240, which is attached to the first panel 280. The bracket 220 also forms the second hinged coupling with the second attachment bracket 260, which is attached to the second panel 290.

The attachment brackets (240, 260) may be attached to the panels (280, 290) with any suitable attachment mechanism, such as, for example, screws, rivets, adhesives, and the like.

A first centerline 285 may be defined for the first panel 280 and a second centerline 295 may be defined for the second panel 290. The centerlines (285, 295) define a line that is substantially equidistant from the hinge structures 298 of the first panel 280 and the second panel 290.

The centerlines (285, 295) are shown as lines with a substantially plumb inclination in FIG. 4. In embodiments of the present disclosure, the centerline 285 of the first panel 280 substantially coincides with the first pivot line 248. Similarly, the centerline 295 of the second panel 290 substantially coincides with the second pivot line 268. With this configuration, when the panels (280, 290) rotate as the door 120 opens or closes along the pivot lines 248 and 268 substantially in line with the centerlines 285 and 295, respectively, lateral forces, and lateral movement of the bracket and roller assembly 200 is substantially reduced or eliminated.

With the lateral displacement along lateral direction 390 substantially reduced or eliminated the first panel 280 and second panel 290 will remain substantially plumb and the roller element 320 is free to traverse along the line of travel 380. Without embodiments of the disclosure the lower edge 115 of the first panel 280 and the lower edge 115 of the second panel 290 may move laterally relative to upper portions 170 of the panels (280, 290) causing the panels (280, 290) to move out of plumb as shown by angled lines 285A and 295A.

Some embodiments of the disclosure may include an additional mechanism for reducing or eliminating lateral displacement along lateral direction 390. As stated previously when discussing FIG. 3, the roller assembly 300 may be prevented or impeded from pivoting in the pivoting motion 395 using a roller pivot control structure. The reduction in an in ability of the roller element 320 to pivot may assist in keeping the roller element 320 moving along the line of travel 380 and thus reduce movement of the roller element 320 in the lateral direction 390.

In FIG. 3, the roller pivot control structure took the form of a square pin 322 in a square hole 332. In FIG. 5, two other optional roller pivot control structures are shown. In FIG. 5, a round pin 322 is shown in a round hole. As a result, and referring to FIGS. 3 and 5, the roller assembly 200 would be relatively free to perform pivoting motion 395. However, a key 324 may be mated with slots in the round pin 322 and round hole to prevent the pivoting motion 395.

As another optional roller pivot control structure, a pivot biasing element 370 may be coupled between the pin 322 and the receiver 330 or bracket 220. This pivot biasing element 370 may be used to allow some pivoting motion 395, but still resist excessive pivoting motion 395. Allowing some pivoting motion 395, may be desirable in a situation where the line of travel 380 forms a curvilinear path on the floor or other structure in contact with the roller element 320.

As yet another optional roller pivot control structure, with suitable attachment to the pin 322 and the receiver 330 or bracket 220, the longitudinal biasing element 360 may be configured to provide a pivoting bias as well as the longitudinal bias.

Figure 6:
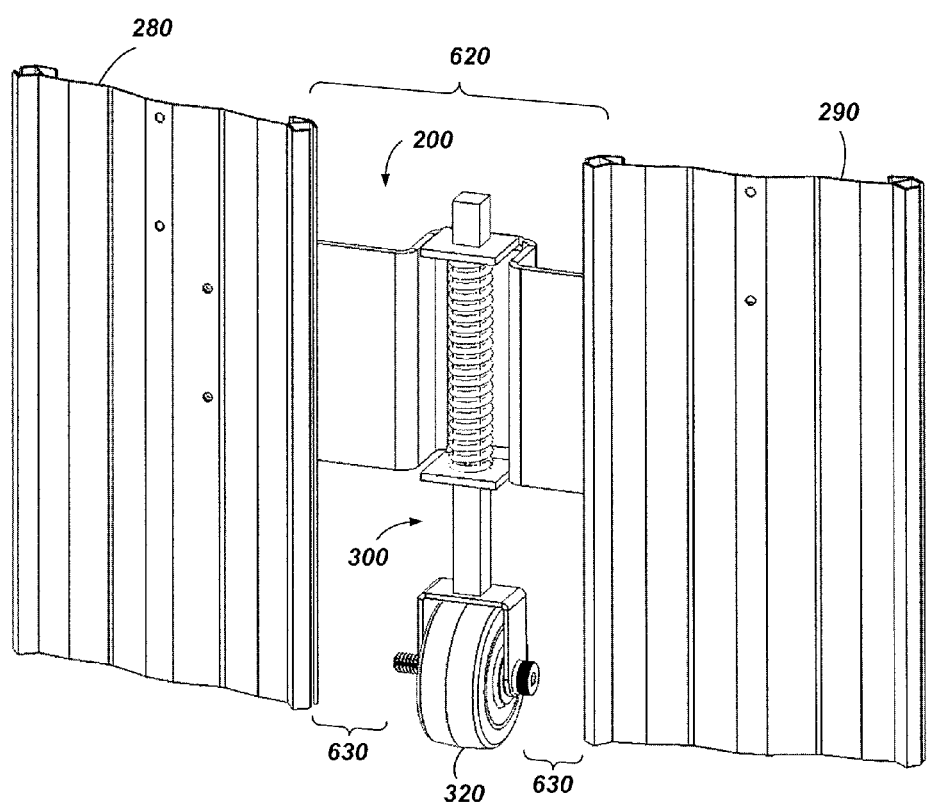
FIG. 6 shows a perspective view of the bracket and roller assembly attached to panels of the movable partition with the partitions in a closed position in accordance with an embodiment of the present disclosure.

FIG. 6 shows a perspective view of the bracket and roller assembly 200 attached to panels 280 and 290 of the movable partition with the panels 280 and 290 in a closed position in accordance with an embodiment of the present disclosure. FIG. 6 illustrates that the roller assembly 300 fits between the first panel 280 and the second panel 290 when they are in the closed position without causing the first and second panels 280 and 290 to be spaced any farther apart than for a movable partition using a conventional roller assembly. In other words, the spacing 620 between panels 280, 290 can be maintained the same as for many conventional movable partitions with adequate clearance 630 between the roller assembly 300 and each of the first and second panels 280 and 290. Moreover, when the roller element 320 is centered between the first and second panels 280 and 290, the clearance 630 on each side of the roller assembly 300 will be substantially the same.

Figure 7:
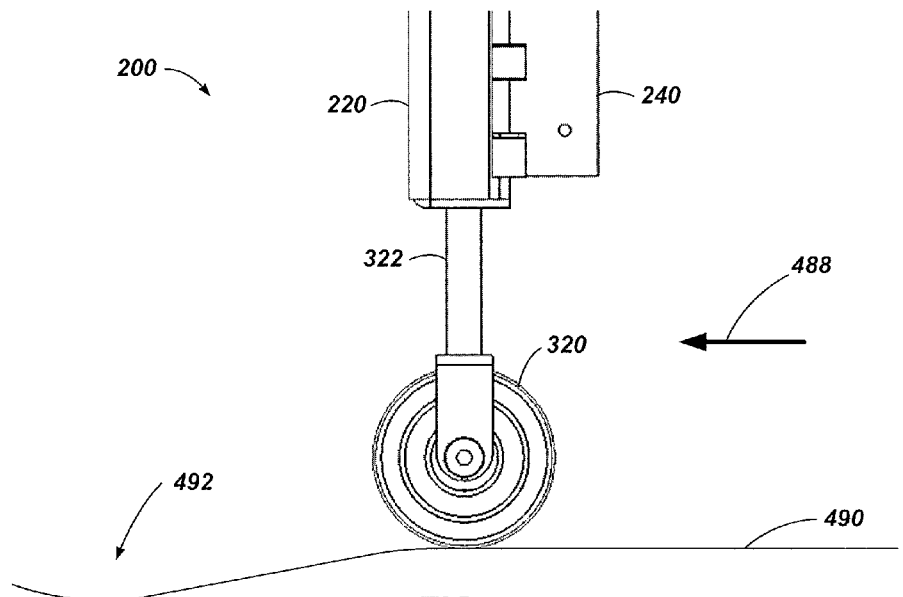
FIG. 7 is a side view of a portion of the bracket and roller assembly for operation on substantially nonplanar surface features of an adjacent structure in accordance with an embodiment of the present disclosure.

FIG. 7 is a side view of a portion of the bracket and roller assembly 200 for operation on substantially nonplanar surface features of an adjacent structure 490 in accordance with an embodiment of the present disclosure. The roller element 320 may roll along an adjacent structure 490, such as, for example, a floor of a room including the movable partition. FIG. 7 illustrates the roller element 320 coupled to the pin 322, which is coupled to the bracket 220. The first attachment bracket 240 is also illustrated. The roller element 320 traverses the portion of the adjacent structure 490 that includes a valley 492. The longitudinal biasing element 360 (not shown in FIG. 7) causes the roller element 320 to maintain contact with the underlying surface 490 as it traverses the valley 492, and perhaps hills (not shown). Not only does the roller element 320 maintain contact with the adjacent structure 490 as it traverses the valley 492, it also maintains a force correlated to the spring constant of the longitudinal biasing element 360 between the roller element 320 and the adjacent structure 490 to help reduce or prevent lateral movement.

As the apparatus continues in the direction indicated by directional arrow 488, the roller element 320 encounters a further elevation change in the adjacent structure 490 as it leaves the valley 492. The longitudinal biasing element 360 will again maintain contact between the roller element 320 and the adjacent structure 490.

Figure 8:
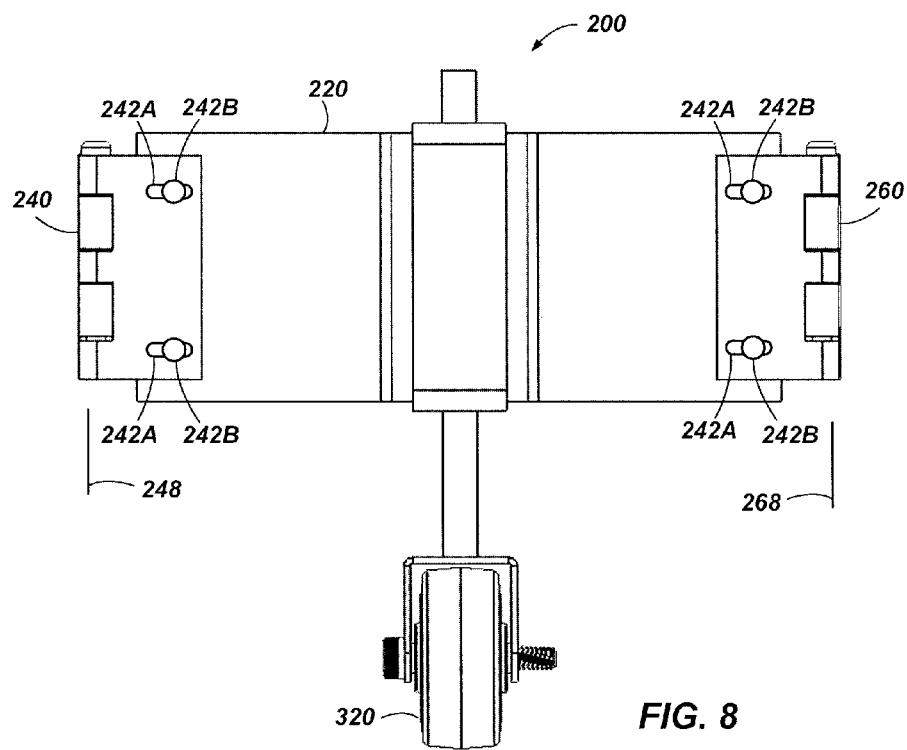
FIG. 8 is a front view of the bracket and roller assembly illustrating adjustment structures in accordance with an embodiment of the present disclosure.

FIG. 8 is a front view of the bracket and roller assembly 200 illustrating adjustment structures in accordance with an embodiment of the present disclosure. Bracket adjusters 242A and 242B are configured between the bracket 220 and the first attachment bracket 240 and between the bracket 220 and the second attachment bracket 260. These bracket adjusters (242A, 242B) allow for the first pivot line 248 to be moved relative to the roller element 320 and allow for the second pivot line 268 to be moved relative to the roller element 320.

In FIG. 8 the bracket adjusters 242A and 242B are illustrated with a slot and pin structure such that the attachment brackets (240, 260) may be moved, then secured relative to the bracket 220. Securing may be as simple as a screw to hold the slots in the same position relative to the screw. Of course, many other adjustment mechanisms may be used to move the first pivot line 248 and the second pivot line 268 relative to the roller element 320.

In some embodiments, it may be desirable to allow a distance between the first pivot line 248 and the second pivot line 268 to be adjusted. For example, Referring to FIGS. 1A-1C, the bracket and roller assembly 200 may be used with different types of doors 120 or for making fine tuning adjustments so the panels 104 remain parallel to each other such that the lower edges 115 are the same distance apart as the upper portions 170 near the track 114. In addition, when a door is configured to follow a curvilinear path, adjusting the roller element 320 to be slightly off-center may assist in controlling lateral displacement of the panels 104 relative to the track 114. FIG. 8 shows the first attachment bracket 240 and second attachment bracket 260 attached to the bracket 220 such that they are slightly offset to the left, making the roller element 320 slightly offset between the first pivot line 248 and the second pivot line 268.

Figure 9A:
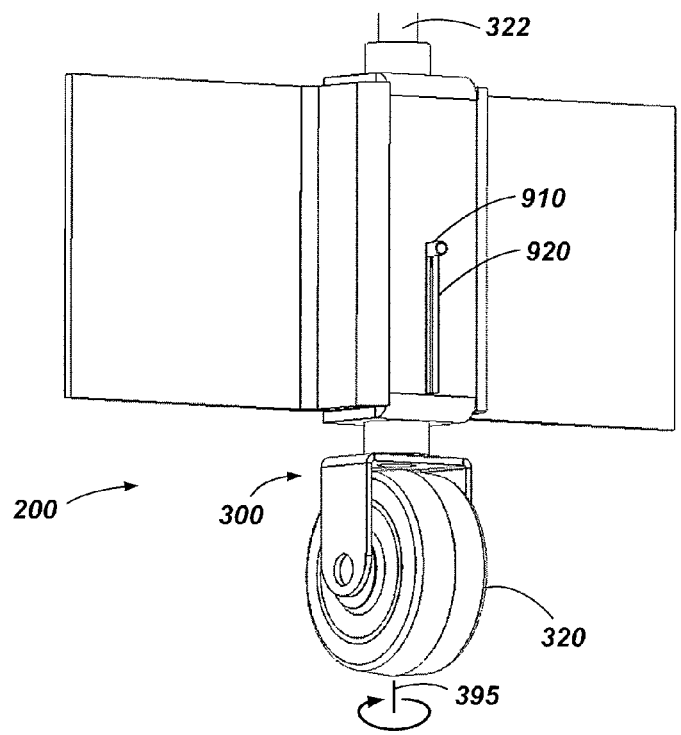
FIGS. 9A and 9B are perspective views of the bracket and roller assembly illustrating a roller pivot control structure in accordance with an embodiment of the present disclosure.
Figure 9B:
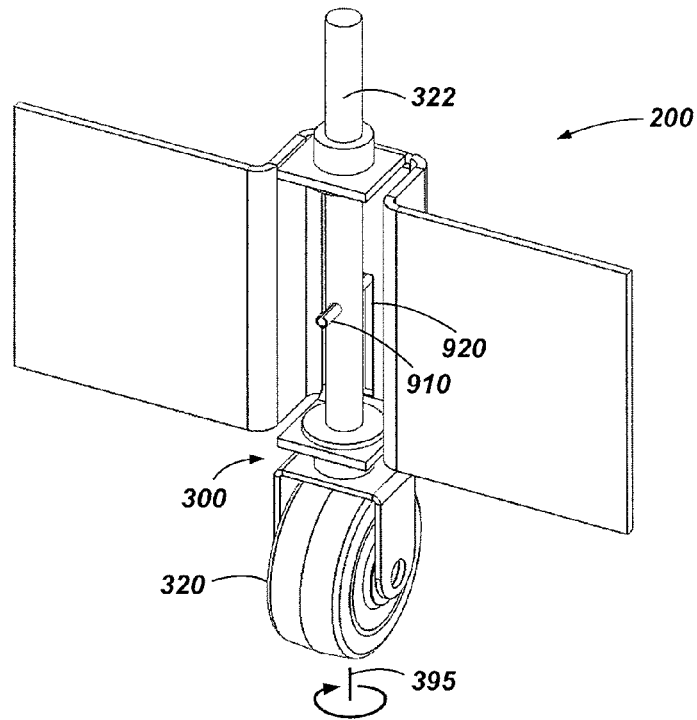

FIGS. 9A and 9B are perspective views of the bracket and roller assembly 200 illustrating a roller pivot control structure in accordance with an embodiment of the present disclosure. In this embodiment, the roller pivot control structure includes a retaining pin 910 in a travel slot 920. For clarity, the longitudinal biasing element 360 (FIG. 4) is not illustrated in FIGS. 9A and 9B). As the roller assembly 300 moves along uneven surfaces, as discussed with respect to FIG. 7, the retaining pin 910 may travel up and down the travel slot 920 while still resisting a pivot motion of the roller element 320 about the pivot axis 395. As a non-limiting example, the travel slot 920 may have a height that is about the same distance that the longitudinal biasing element 360 can compress (e.g., roughly 1½ inches for one embodiment).

When the panels 280 and 290 (FIG. 4) traverse a curved path, the outside panels have to travel further than the inside panels. As a result, this difference in travel distance automatically causes the wheel assembly to be steered to the inside of the curve. In other words, the curves traveled by the panels 280 and 290 and directed by the drive guide member 160 (FIG. 2) help the bracket and roller assembly 200 navigate a similar curve even if the roller element 320 is not allowed to pivot. However, in some cases, enabling the roller element 320 to pivot may enable a more true and free traversal of curves for the roller assembly 300. As a non-limiting example, on a small radius (e.g., about 5 feet) curved path, the paired outside panel may get too far ahead of its paired inside panel causing the wheel to over steer to the inside.

To allow for the roller element 320 to pivot somewhat along the pivot axis 395, the travel slot 920 may be widened such that the retaining pin 910 may move side-to-side within the travel slot 920. In other words, the degree the roller element 320 is allowed to pivot becomes a function of the width of the travel slot 920 relative to the diameter of the retaining pin 910. As a non-limiting example, with a ⅛th inch retaining pin 910 the travel slot 920 may be configured with a width of about 0.125 inches for zero turning, about 0.141 inches for an arc of about 5 degrees of turning (i.e., about +/−2.5 degrees) and about 0.158 inches for an arc of about 10 degrees of turning.

In addition, in some embodiments, the tendency of the wheel to roll in a straight line can be enhanced as needed by a horizontal offsetting of the axel of the roller element 320 relative to the wheel assembly shaft 322. In this configuration, wheel assembly shaft 322 tends to pull the roller element 320 along and slightly behind, which keeps the roller element 320 following a straight path.

Figure 10:
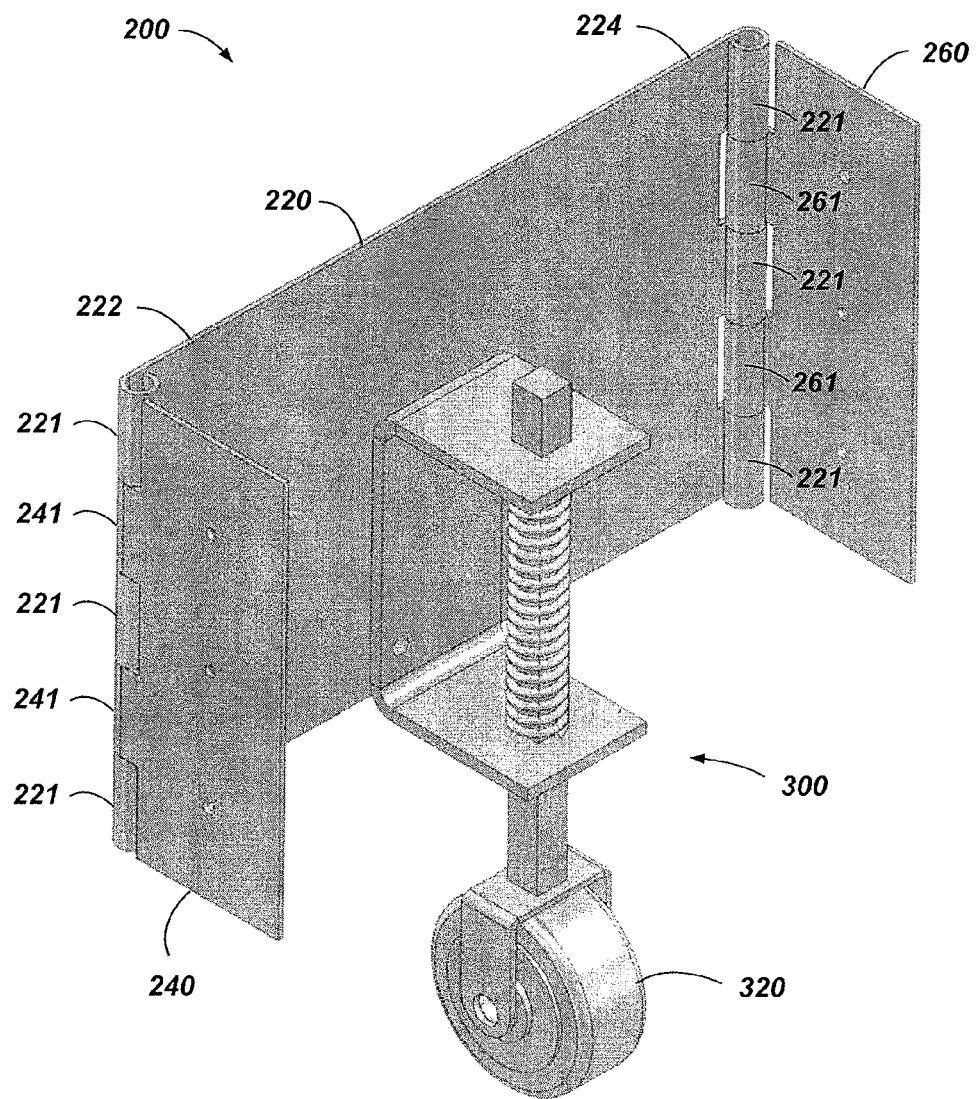
FIG. 10 is a perspective view of another embodiment of the bracket and roller assembly.

FIG. 10 is a perspective view of another embodiment of the bracket and roller assembly 200. In this embodiment, the bracket 220 is formed in a single piece with knuckles 221 on the ends of the first side 222 and the second side 224. These knuckles 221 can receive corresponding knuckles 241 and 261 formed in the first attachment bracket 240 and the second attachment bracket 260, respectively so that when brought together knuckles (241 and 261) interleave with knuckles 221. Hinge pins (not shown) may then be placed through the interleaved knuckles 221, 241, and 261 to hold the three brackets (220, 240, and 260) together.

While the invention may be susceptible to various modifications and alternative forms, specific embodiments have been shown by way of example in the drawings and have been described in detail herein. However, it should be understood that the invention is not intended to be limited to the particular forms disclosed. It is also noted that various features of any of the described embodiments may be combined with features of other described embodiments as will be apparent to those of ordinary skill in the art. The invention, therefore, includes all modifications, equivalents, and alternatives falling within the spirit and scope of the invention as defined by the following appended claims.

What is claimed is:

1. A movable partition including an apparatus for controlling displacement of the movable partition, the movable partition comprising:
   a first sheet of panels;

a second sheet of panels located beside the first sheet of panels, wherein each of the first sheet of panels and the second sheet of panels comprises a plurality of panels coupled to and spaced apart from one another by a plurality of hinges each having a lateral width less than a lateral width of the plurality of panels; and at least one lateral stabilization a apparatus disposed between the first sheet of panels and the second sheet of panels and configured to impart lateral stability to the movable partition, the at least one lateral stabilization apparatus comprising:
a bracket;
a roller assembly coupled to the bracket and comprising at least one roller element;
a first attachment bracket hingedly coupled to a first side of the bracket, the first attachment bracket attached to a first panel of the movable partition at a middle portion of the first panel proximate to a centerline of the first panel such that a first pivot line formed between the first attachment bracket and the first side of the bracket substantially coincides with the centerline of the first panel; and
a second attachment bracket hingedly coupled to a second side of the bracket, the second attachment bracket attached to a middle portion of the second panel proximate to the centerline of the second panel such that a second pivot line formed between the second attachment bracket and the second side of the bracket substantially coincides with the centerline of the second panel.

2. The movable partition of claim 1, wherein the roller assembly further includes a receiver for:
accepting the at least one roller element;
positioning the at least one roller element to extend below a lower edge of the first panel and the second panel; and
providing a roller pivot control structure for substantially holding the at least one roller element in a direction substantially perpendicular to the bracket.

3. The movable partition of claim 2, wherein the roller pivot control structure comprises a pin with a polygonal cross-section for disposition in a compatible polygonal hole of the receiver.

4. The movable partition of claim 2, wherein the roller pivot control structure comprises a key element to substantially prevent a pin of the at least one roller element from rotation when the pin is disposed in a hole of the receiver.

5. The movable partition of claim 2, wherein the roller pivot control structure comprises a pivot biasing element configured to bias pivoting of a line of travel for the at least one roller element relative to the bracket.

6. The movable partition of claim 2, further comprising a longitudinal biasing element configured to bias displacement of the at least one roller element relative to the bracket in a direction in line with the first pivot line and the second pivot line.

7. The movable partition of claim 6, wherein the longitudinal biasing element is further configured to bias pivoting of a line of travel for the at least one roller element relative to the bracket.

8. The movable partition of claim 2, wherein the roller pivot control structure comprises:
a travel slot in the bracket; and
a retaining pin coupled to the roller assembly and at least partially disposed through the travel slot and configured to allow travel of the at least one roller element in a direction substantially parallel with the first pivot line and the second pivot line while resisting pivoting of the at least one roller element relative to the direction substantially perpendicular to the bracket.

9. The movable partition of claim 8, wherein a width of the travel slot is larger than a width of the retaining pin to enable pivoting of the at least one roller element relative to the direction substantially perpendicular to the bracket within an arc correlated to a difference in the width of the travel slot and the width of the retaining pin.

10. The movable partition of claim 1, wherein the bracket includes one or more bracket adjusters for modifying a distance between the first pivot line and the second pivot line.

11. A movable partition including a displacement control assembly comprising:
a first sheet of panels;
a second sheet of panels located beside the first sheet of panels, wherein each of the first sheet of panels and the second sheet of panels comprises a plurality of panels coupled to and spaced apart from one another by a plurality of hinges each having a lateral width less than a lateral width of the plurality of panels, the plurality of hinges being a separate structure from the first sheet of panels and the second sheet of panels; and
a displacement control assembly comprising:
a bracket;
a first attachment bracket hingedly coupled to a first side of the bracket to form a first pivot line;
a second attachment bracket hingedly coupled to a second side of the bracket to form a second pivot line; and
a roller assembly comprising at least one roller element and coupled to the bracket between the first pivot line and the second pivot line;
wherein, when the first attachment bracket is attached to a first panel of the movable partition at a middle portion of the first panel proximate to a centerline of the first panel with the first pivot line substantially in line with the centerline of the first panel and the second attachment bracket is attached to a second panel of the movable partition at a middle portion of the second panel proximate to a centerline of the second panel with the second pivot line substantially in line with the centerline of the second panel, the roller assembly is positioned to contact a surface of an adjacent structure and provide resistance to a lateral movement of a lower edge of the first panel relative to an upper portion of the first panel.

12. The movable partition of claim 11, wherein the roller assembly further includes a receiver for:
accepting the at least one roller element;
positioning the at least one roller element to extend below the lower edge of the first panel and the second panel; and
providing a roller pivot control structure for substantially holding the at least one roller element in a direction substantially perpendicular to the bracket.

13. The movable partition of claim 12, wherein the roller pivot control structure comprises a pin with a polygonal cross-section for disposition in a compatible polygonal hole of the receiver.

14. The movable partition of claim 12, wherein the roller pivot control structure comprises a key element to substantially prevent a pin of the at least one roller element from rotation when the pin is disposed in a hole of the receiver.

15. The movable partition of claim 12, wherein the roller pivot control structure comprises a pivot biasing element configured to bias pivoting of a line of travel for the at least one roller element relative to the bracket.

16. The movable partition of claim 12, further comprising a longitudinal biasing element configured to bias displacement of the at least one roller element relative to the bracket in a direction in line with the first pivot line and the second pivot line.

17. The movable partition of claim 16, wherein the longitudinal biasing element is further configured to bias pivoting of the at least one roller element relative to the bracket.

18. The movable partition of claim 12, wherein the bracket includes one or more bracket adjusters for modifying a distance between the first pivot line and the at least one roller element and a distance between the second pivot line and the at least one roller element.

19. A method of controlling a movable partition, the method comprising:
displacing a movable partition along a path adjacent a surface of an adjacent structure, the movable partition comprising a plurality of movable coupled panels and a roller assembly coupled to one or more of the hingedly coupled panels of the movable partition such that at least one roller element of the roller assembly is in contact with a surface of an adjacent structure that the one or more panels will traverse, wherein each panel of the plurality of panels exhibits a lateral width that is substantially equal to the remaining panels of the plurality of panels, each panel of the plurality of panels is directly coupled to an adjacent panel of the plurality of panels by a hinge structure, the lateral width of each panel of the plurality of panels being greater than a lateral width of the hinge structure; and
maintaining a substantially plumb inclination of the one or more panels by resisting movement of the at least one roller element in a direction substantially perpendicular to the path while the roller assembly is hingedly coupled to each of the one or more panels at a centerline of each of the one or more panels.

20. The method of claim 19, further comprising providing a pivot resistance for substantially maintaining the at least one roller element in the direction substantially perpendicular to the path.

21. The method of claim 20, wherein providing the pivot resistance comprises coupling the roller assembly to a bracket coupled to the one or more panels with a pin having a polygonal cross-section for disposition in a compatible polygonal hole of the bracket.

22. The method of claim 20, wherein providing the pivot resistance comprises biasing against pivoting the at least one roller element relative to the path.

23. The method of claim 20, further comprising biasing the at least one roller element to maintain contact with the surface of the adjacent structure while the at least one roller element traverses the path.

24. The method of claim 23, wherein biasing the at least one roller element to maintain contact with the surface uses a bias element that also provides biasing against pivoting the at least one roller element relative to the path.

25. The method of claim 20, wherein:
the surface of the adjacent structure includes one or more substantially nonplanar surface features; and
biasing the at least one roller element to maintain contact with the surface further comprises maintaining contact between the surface of the adjacent structure while the at least one roller element traverses the one or more substantially nonplanar surface features.

26. An automatic door comprising:
a plurality of pivotably coupled panels, each panel of the plurality of pivotably coupled panels being coupled to at least one adjacent panel of the plurality of pivotably coupled panels by a hinge of a plurality of discrete hinges, each hinge of the plurality of hinges being received in a hinge-receiving structure on one side of a panel of the plurality of pivotably coupled panels and another hinge-receiving structure on one side of an adjacent panel of the plurality of pivotably coupled panels;
a drive configured to motivate the plurality of pivotably coupled panels along a defined pathway; and
one or more apparatuses coupled proximate a lower edge of one or more of the pivotably coupled panels, each apparatus comprising:
a bracket;
a roller assembly attached to the bracket and including at least one roller element;
a first attachment bracket hingedly coupled to a first side of the bracket to form a first pivot line; and
a second attachment bracket hingedly coupled to a second side of the bracket to form a second pivot line;
wherein:
the first attachment bracket is attached to a first panel of the pivotably coupled panels and positioned at a middle portion of the first panel proximate to a centerline of the first panel such that the first pivot line aligns with the centerline of the first panel; and
the second attachment bracket is attached to a second panel of the pivotably coupled panels and positioned at a middle portion of the second panel proximate to a centerline of the second panel such that the second pivot line aligns with the centerline of the second panel.

27. The automatic door of claim 26, wherein each apparatus is located and configured to position the at least one roller element in contact with a surface adjacent the lower edge of the plurality of pivotably coupled panels.

28. The automatic door of claim 26, wherein the plurality of pivotably coupled panels forms a first partition including a first quantity of the plurality of pivotably coupled panels and a second partition including a second quantity of the plurality of pivotably coupled panels.

29. The automatic door of claim 28, wherein the second partition is laterally spaced from the first partition.

30. The automatic door of claim 28, wherein the first partition includes the first panel and the second partition includes the second panel.

* * * * *